US009136763B2

(12) United States Patent
Houston et al.

(10) Patent No.: US 9,136,763 B2
(45) Date of Patent: Sep. 15, 2015

(54) AUDIO FREQUENCY DEADBAND SYSTEM AND METHOD FOR SWITCH MODE REGULATORS OPERATING IN DISCONTINUOUS CONDUCTION MODE

(71) Applicant: Intersil Americas LLC, Milpitas, CA (US)

(72) Inventors: M. Jason Houston, Cary, NC (US); Steven P. Laur, Raleigh, NC (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 298 days.

(21) Appl. No.: 13/930,489

(22) Filed: Jun. 28, 2013

(65) Prior Publication Data

US 2014/0368174 A1    Dec. 18, 2014

Related U.S. Application Data

(60) Provisional application No. 61/836,262, filed on Jun. 18, 2013.

(51) Int. Cl.
*H02M 3/158* (2006.01)

(52) U.S. Cl.
CPC ..................... *H02M 3/158* (2013.01)

(58) Field of Classification Search
CPC ....................................................... H02M 3/158
See application file for complete search history.

(56) References Cited

U.S. PATENT DOCUMENTS

| | | | | |
|---|---|---|---|---|
| 6,215,288 B1 * | 4/2001 | Ramsey et al. | ............... | 323/224 |
| 8,018,208 B1 * | 9/2011 | Kahn et al. | .................... | 323/224 |
| 8,080,987 B1 * | 12/2011 | Qiu et al. | ....................... | 323/288 |
| 2005/0258808 A1 * | 11/2005 | Chen et al. | .................... | 323/222 |
| 2005/0258814 A1 * | 11/2005 | Chen et al. | .................... | 323/285 |
| 2006/0049815 A1 * | 3/2006 | Ho et al. | ......................... | 323/282 |
| 2006/0113974 A1 * | 6/2006 | Kan et al. | ....................... | 323/282 |
| 2007/0018627 A1 * | 1/2007 | Chen | ............................. | 323/283 |
| 2007/0096707 A1 * | 5/2007 | Xi | ................................. | 323/283 |
| 2008/0042709 A1 * | 2/2008 | Chen et al. | .................... | 327/175 |
| 2008/0088289 A1 * | 4/2008 | Fogg et al. | .................... | 323/283 |
| 2008/0252280 A1 * | 10/2008 | Prodic et al. | .................. | 323/283 |
| 2009/0009292 A1 * | 1/2009 | Hill | ............................. | 340/10.1 |
| 2009/0237959 A1 * | 9/2009 | Soenen et al. | .................. | 363/13 |
| 2012/0074924 A1 * | 3/2012 | Dequina et al. | ............... | 323/351 |
| 2012/0169306 A1 * | 7/2012 | Wu | ................................ | 323/271 |
| 2012/0212204 A1 * | 8/2012 | Philbrick et al. | ............. | 323/284 |
| 2013/0293212 A1 * | 11/2013 | Philbrick et al. | ............. | 323/283 |
| 2013/0300388 A1 * | 11/2013 | Laur et al. | .................... | 323/282 |
| 2013/0300392 A1 * | 11/2013 | Laur et al. | .................... | 323/284 |
| 2014/0002047 A1 * | 1/2014 | Houston et al. | ............... | 323/283 |

* cited by examiner

Primary Examiner — Emily P Pham
(74) Attorney, Agent, or Firm — Gary Stanford

(57) ABSTRACT

A controller for controlling operation of a switching regulator including a modulator, a discontinuous conduction mode (DCM) controller, an audible DCM (ADCM) controller, and a sub-sonic discontinuous conduction mode (SBDCM) controller. The modulator generally operates in a continuous conduction mode. The DCM controller modifies operation to DCM during low loads. The ADCM controller detects when the switching frequency is less than a super-sonic frequency threshold and modifies operation to maintain the switching frequency at a super-sonic frequency level. The SBDCM controller detects a sub-sonic operating condition during ADCM operation and responsively inhibits operation of the ADCM mode controller to allow a SBDCM mode within a sub-sonic switching frequency range. The SBDCM operating mode allows for efficient connected standby operation. The SBDCM controller allows operation to return to other modes when the switching frequency increases above the sub-sonic level.

20 Claims, 8 Drawing Sheets

AUDIO FREQUENCY DEADBAND SYSTEM AND METHOD FOR SWITCH MODE REGULATORS OPERATING IN DISCONTINUOUS CONDUCTION MODE

CROSS-REFERENCE TO RELATED APPLICATIONS

This application claims the benefit of U.S. Provisional Application Ser. No. 61/836,262, filed on Jun. 18, 2013 which is hereby incorporated by reference in its entirety for all intents and purposes.

BRIEF DESCRIPTION OF THE DRAWINGS

The benefits, features, and advantages of the present invention will become better understood with regard to the following description and accompanying drawings, in which.

DETAILED DESCRIPTION

Figure 1:
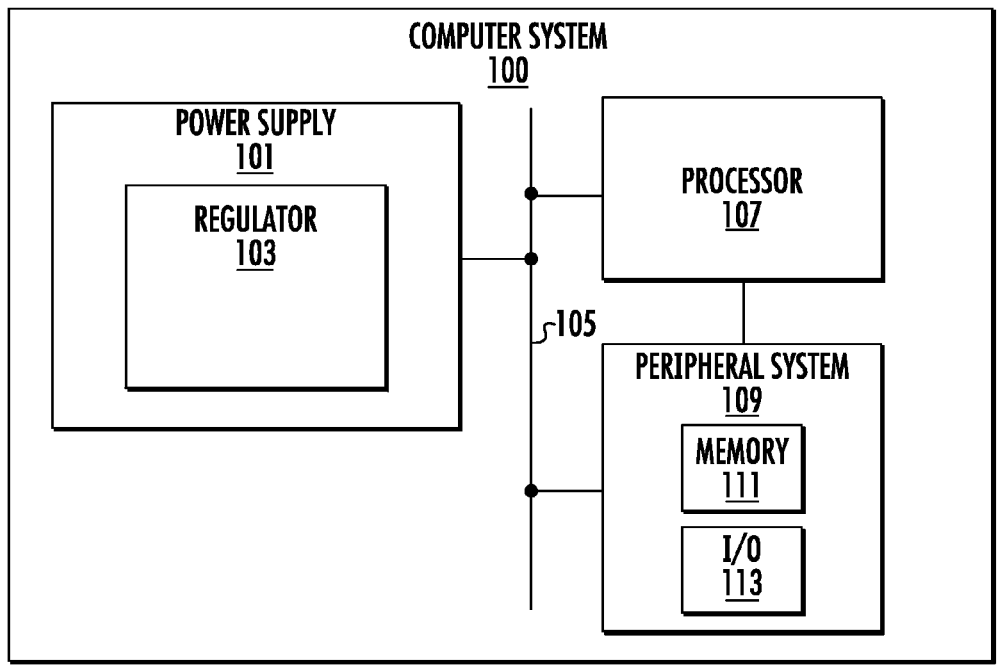
FIG. 1 is a simplified block diagram of a computer system configured with a power supply including a regulator implemented according to one embodiment.

The benefits, features, and advantages of the present invention will become better understood with regard to the following description, and accompanying drawings The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

A regulator may be configured to operate in any of several operating modes depending upon the output load. The regulator typically operates in a continuous conduction mode (CCM) during higher load conditions, in which current through the output inductor increases and decreases during switching cycles but does not fall to zero. Instead, current is continuously delivered to the output load and/or output capacitor. When the load decreases by a certain amount, the inductor current may not only reach zero, but may go negative in consecutive switching cycles during CCM. At very light loads, much of the charge delivery through the output inductor is wasted in the CCM operating mode. In particular, charge is inefficiently moved about as charge in excess of the load demand is moved into the output capacitor and then dumped to ground. Thus, CCM is very inefficient at lighter loads.

A regulator may be configured to operate in a discontinuous conduction mode (DCM) in which a switching device or the like is turned off when the inductor current reaches zero to prevent the inductor current from going negative. During DCM, each charge packet during a power portion is delivered to the load or output capacitor and then switching is suspended until an additional charge packet is needed at the output. Since switching is suspended during one or more cycles during DCM, the frequency of operation of the regulator changes with the load, so that the resultant switching frequency $F_{SW}$ may be roughly proportional to the load. During DCM, power losses are averaged over the new periods.

DCM provides an advantage over CCM at the lighter load range because efficiency is increased. The frequency of operation during DCM, however, is generally uncontrolled since it generally follows load conditions. If the load decreases by a certain amount during DCM, the operating switching frequency can decrease to the audible range causing the switch mode regulator to produce audible noise. Ceramic capacitors, which are popular for use in the power supplies of many consumer electronic products including mobile computing devices and the like, have an inherent piezoelectric effect that produces audible noise when excited at audible frequencies. Also, the switching noise on voltage rails that supply audio integrated circuits (ICs) or semiconductor chips or the like may be amplified causing additional audible noise. Many end applications, especially in the consumer electronic space, have sensitivity to energy in the audible spectrum. Audible noise is highly undesirable in many consumer products and the like.

In order to address audio-sensitive applications, audio DCM methods have been developed. Audible DCM (ADCM) was developed as a patch to prevent the operating frequency of the regulator from entering the audio spectrum. A regulator incorporating ADCM monitors the DCM switching period against a predetermined timing threshold set sufficiently above audio frequencies. When the switching period exceeds the threshold indicating that the switching period is about to enter the audible spectrum, a new pulse-width modulation (PWM) pulse is issued. In this manner, the switching period is prevented from increasing to the audible range so that the corresponding switching frequency $F_{SW}$ remains super-sonic and inaudible.

A switching regulator incorporating CCM, DCM and ADCM operates in CCM at higher loads, switches to DCM as the load decreases while switching frequency $F_{SW}$ remains above the audible range, and then switches to ADCM at light loads in which the DCM switching frequency would otherwise enter the audible range. DCM provides the greatest level of efficiency at lighter loads. Although ADCM is more efficient than CCM at lighter loads, it is not as efficient as DCM but at least prevents audible noise. ADCM, however, significantly limits the power savings achieved by DCM at very light loads. In this manner, ADCM is a tradeoff between efficiency and consumer annoyance at very light loads.

It is desirable for electronic devices, particularly consumer electronic devices, such as ultrabooks, tablets, smart phones, etc., to have very high efficiency in "connected standby" operation. Connected standby operation means that the device is in a low-powered state, including an idle state, and that may be transitioned very quickly into a fully operational state. DCM provides the greatest efficiency but suffers from audio noise when operating in the audible frequency range. ADCM eliminates the audio noise but significantly reduces efficiency for operating frequencies below the super-sonic range including connected standby operation.

FIG. 1 is a simplified block diagram of a computer system 100 configured with a power supply 101 including a regulator 103 implemented according to one embodiment. The power supply 101 develops one or more supply voltages which provide power to other system devices of the computer system 100 via a connection network 105. The connection network 105 may be a bus system or switch system or a set of conductors or the like. In the illustrated embodiment, the computer system 100 includes a processor 107 and a peripheral system 109 both coupled to the connection network 105 to receive supply voltages from the power supply 101. In the illustrated embodiment, the peripheral system 109 may include any combination of a system memory 111 (e.g., including any combination of RAM and ROM type devices and memory controllers and the like), and an input/output (I/O) system 113, which may include system controllers and the like, such as graphic controllers, interrupt controllers, keyboard and mouse controllers, system storage device controllers (e.g., controllers for hard disk drives and the like), etc. The illustrated system is exemplary only, since many of the processor system and support devices may be integrated onto the processor chip as understood by those skilled in the art.

Figure 2:
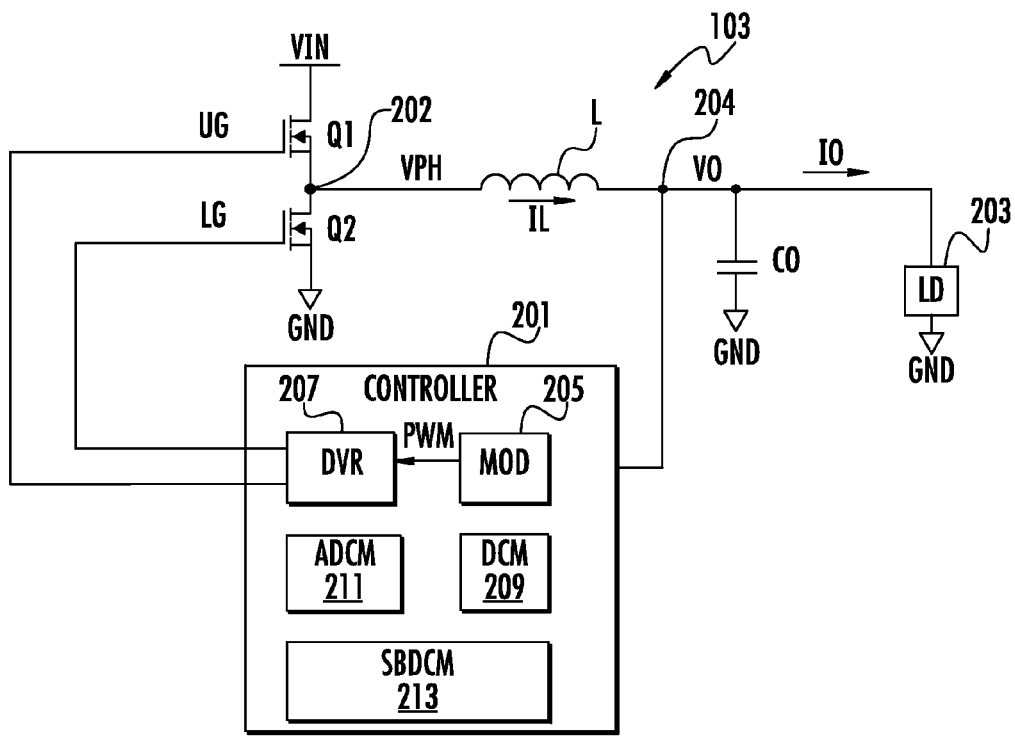
FIG. 2 is a simplified schematic and block diagram of the regulator of FIG. 1, which is shown as a buck-type DC-DC switch mode regulator implemented according to one embodiment.

FIG. 2 is a simplified schematic and block diagram of the regulator 103, which is shown as a buck-type DC-DC switch mode regulator implemented according to one embodiment. Although a buck-type DC-DC regulator is shown and described, it is understood that principles as described herein may be applied to any other type of regulator, such as boost-type regulators and the like. Any type of regulator is contemplated in which DCM may be incorporated to improve efficiency at lower loads and ADCM may be incorporated to avoid audible frequency generation during DCM.

The regulator 103 includes a controller 201 for receiving an output voltage VO. It is noted that a feedback network or the like (not shown) may be used to sense VO and provide a sensed version of VO (e.g., voltage divider or the like providing a feedback sense voltage VFB, not shown) rather than directly sensing VO itself. The controller 201 is shown in general form, and may be implemented according to voltage mode control, current mode control, constant on-time (or constant frequency), etc., and may be configured as an analog controller, or a digital controller or the like.

The controller 201 provides an upper gate drive signal UG to a gate terminal of upper switch Q1 and a lower gate drive signal LG to a gate terminal of lower switch Q2. The UG and LG signals are otherwise referred to as switch control signals for controlling activation of the electronic switches Q1 and Q2, respectively. In the illustrated embodiment, electronic switches Q1 and Q2 are shown as a pair of N-channel metal-oxide semiconductor, field-effect transistors (MOSFETs) as known to those skilled in the art. Other types of electronic switching devices may be used including other types of FETs and the like, and other types of transistors, such as bipolar junction transistors (BJTs) or insulated-gate bipolar transistors (IGBTs) and the like, etc. The switch Q1 has drain and source terminals coupled between VIN and a phase node 202 and the switch Q2 has drain and source terminals coupled between phase node 202 and ground (GND). The switches Q1 and Q2 are controlled to switch input voltage VIN through the phase node 202 coupled to one end of an output inductor L, having its other end coupled to the output node 204. The phase node 202 develops a phase voltage VPH and the output voltage VO is filtered by an output capacitor CO coupled between the output node 204 and GND.

An output load 203 is coupled between the output node 204 and GND. The inductor L develops an inductor current IL, and the output load 203 receives an output current IO. The output load 203 may represent either one or both the processor 107 and the peripheral system 109 and any included components. The output current IO represents the total output current of the regulator 103, and may otherwise be referred to as load current.

In one embodiment, the controller 201 includes a modulator 205, which internally develops a pulse-width modulation (PWM) signal as understood by those of ordinary skill in the art. The PWM signal is provided to a gate driver block (DVR) 207 which develops the UG and LG signals to control the switches Q1 and Q2 to regulate VO to a predetermined voltage level. In normal operation, the modulator 205 operates in a continuous conduction mode (CCM) in which at least one of the switches Q1 and Q2 is on for the entire portion of each PWM cycle (ignoring deadtime periods between switching to ensure that only one of the switches is on at any given time). For example, when PWM goes to a first state (e.g., goes high) indicating a power portion, the modulator 205 turns Q2 off (if it is on) and then turns on Q1 to couple the phase node 202 to VIN. When the PWM switches to a second state (e.g., goes low) in the same cycle, the modulator 205 turns Q1 off and then turns Q2 on to couple the phase node 202 to GND for the remainder of the PWM cycle. Operation repeats in this manner for subsequent PWM cycles during CCM. The modulator 205 controls the duty cycle of the PWM signal for regulation.

The controller 201 further includes a discontinuous conduction mode (DCM) controller 209, an audio DCM (ADCM) controller 211, and a sub-sonic DCM (SBDCM) controller 213. The DCM controller 209 generally incorporates the logic and/or circuitry configured to detect DCM operating conditions and to operate the modulator 205 according to the DCM. In one embodiment, for example, the DCM controller 209 detects the conditions in which the inductor current IL drops to zero or otherwise begins to go negative in successive switching cycles. When these conditions are detected, the DCM controller 209 switches operation from CCM to DCM.

In one embodiment, during DCM when the inductor current IL goes to zero, the lower switch Q2 is turned off and remains off for the remainder of the PWM cycle rather than staying on for the entire remainder of the PWM cycle (as is the case for CCM). In the next cycle upon assertion of PWM, Q1 is turned on generating current through the inductor L, and then is turned off and Q2 turned back on to decrease current through the inductor L. Again, when the inductor current IL reaches zero, Q2 is turned off and remains off until the following cycle. Operation repeats in this manner for DCM.

The ADCM controller 211 generally incorporates the logic and/or circuitry configured to detect ADCM operating conditions and to operate the modulator 205 according to the ADCM. When the modulator 205 is operating in DCM, if the frequency of switching, such as detected by the frequency of the PWM signal (or one or both of the switching signals UG and LG), drops below a predetermined super-sonic frequency threshold $F_{SW\_ADCM}$, then the ADCM controller 211 switches operation from DCM to ADCM.

In one embodiment, for example, the ADCM controller 211 incorporates timing circuitry or the like (e.g., timer 1319, FIG. 13) which detects the time delay between pulses of the PWM signal or the UG signal or the like. When the time delay between consecutive pulses exceeds a predetermined super-sonic threshold period $SP_{TH}$ indicative of the super-sonic frequency threshold $F_{SW\_ADCM}$, then the ADCM controller 211 switches operation from DCM to ADCM as further described herein.

In one embodiment, upon timeout of a timer or the like, the ADCM controller 211 instructs the modulator 205 to trigger an early pulse on LG to expedite DCM operation. The LG pulse turns on Q2 which pulls the output voltage VO down sooner than the case for normal DCM. The modulator 205 terminates the LG pulse and initiates a new switching cycle by asserting a pulse on UG to increase VO. Assuming low load conditions, the UG pulse is relatively narrow and the modulator 205 then asserts a pulse on LG again according to normal operation. Again assuming low load conditions, the DCM controller 209 terminates the LG pulse early when the inductor current IL reaches zero, and operation repeats in this manner.

It is appreciated that the CCM, DCM and ADCM modes of operation are compatible with each other for smooth transitioning between modes. DCM effectively over-rides normal CCM operation by terminating LG pulses early when inductor current goes to zero. ADCM operation effectively over-rides DCM operation by initiating new cycles to avoid DCM operation at audio switching frequencies.

The controller 201 further includes the SBDCM controller 213 implemented according to one embodiment. The SBDCM controller 213 monitors ADCM operation and switches back to DCM mode for sub-sonic DCM (SBDCM) operation. If the load increases, then the SBDCM controller 213 may switch operation back to ADCM. If the load increases substantially, then operation may switch back to super-sonic DCM (SPDCM) or even CCM mode depending upon the load level and monitored conditions as further described herein.

Figure 3:
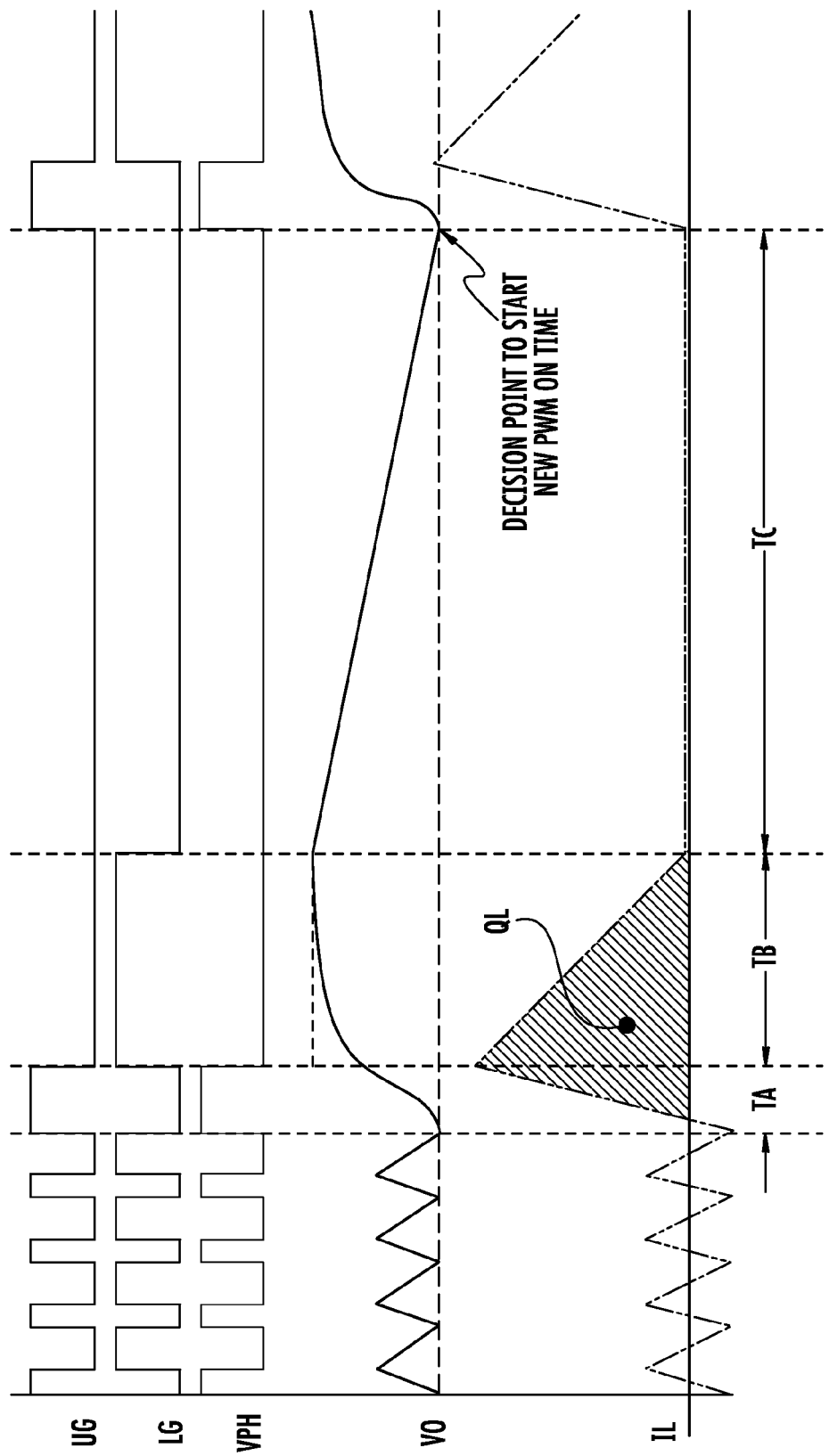
FIG. 3 is a timing diagram generally depicting normal DCM operation of the regulator of FIG. 2.

FIG. 3 is a timing diagram generally depicting normal DCM operation. The UG and LG signals, the VPH and VO voltages, and the IL current are plotted versus time. Up to a time t0, operation is depicted for CCM in which each cycle begins with a pulse of UG followed by a pulse of LG for the remainder of the cycle. Then the next cycle begins with another UG pulse and operation repeats in this manner. The output voltage VO and the inductor current IL both increase during the UG pulses and both decrease during the LG pulses. The voltage of the phase node VPH generally toggles between the input voltage and GND.

At time t0, DCM is initiated starting with a UG pulse between times t0 and t1 (having duration TA) followed by an LG pulse between times t1 and t2 having a duration TB. The inductor current IL reaches a peak level at a time t1 and then falls to zero at about a time t2 terminating the LG pulse. The output voltage VO also reaches a peak level at about time t2 and then decreases at a rate based on the output current IO and the capacitance of the output capacitor CO. As shown, VO decreases to a minimum level at a subsequent time t3 and a new cycle is initiated. The time between t2 and t3 has a duration TC which is based on the load level. In one embodiment, TA+TB is fixed, the DCM switching period is TA+TB+TC, and the duration TC is a function based on a change of VO, or $-\Delta VO$, the load capacitance CO, and the output current IO, or $TC=\Delta VO \cdot CO/IO$.

The period TA+TB is relatively short and fixed so that the DCM period changes with the duration of TC. If TC is sufficiently short, then the DCM period is super-sonic for SPDCM operation. If, however, TC is sufficiently long, then the DCM period otherwise enters the audible range. In that case, the ADCM mode is invoked beginning with a pulse on LG to expedite reduction of the output voltage VO.

Figure 4:
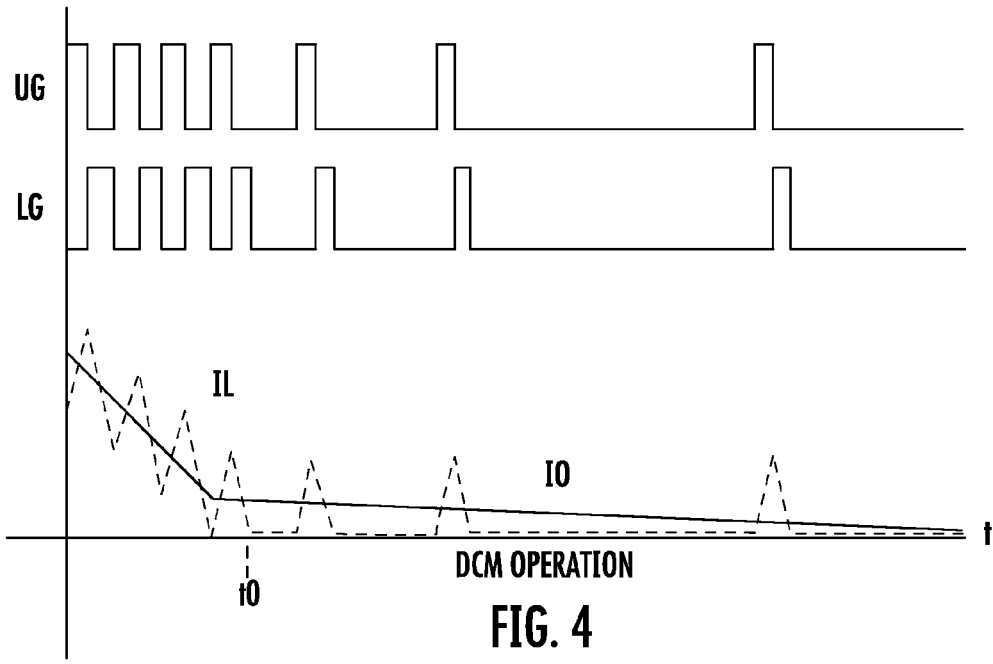
FIG. 4 is a timing diagram illustrating DCM operation and FIG. 5 is another timing diagram illustrating ADCM operation of the regulator of FIG. 2.
Figure 5:
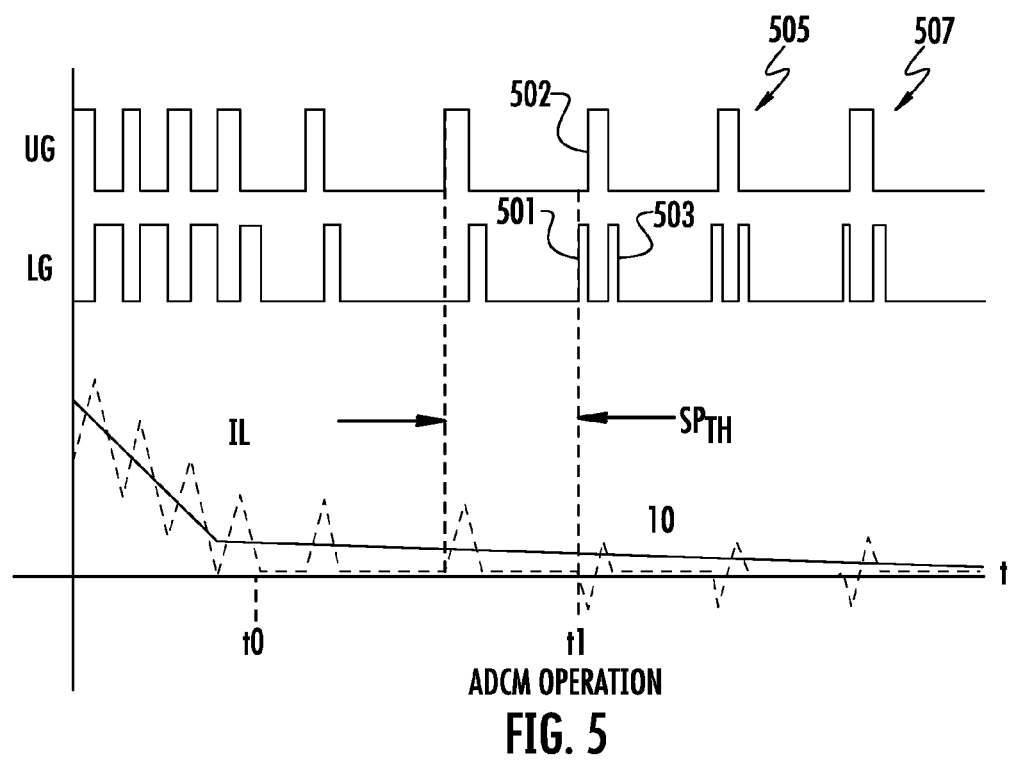

FIG. 4 is a timing diagram illustrating DCM operation and FIG. 5 is another timing diagram illustrating ADCM operation. In each case, the UG and LG pulses are plotted and the inductor current IL and output current IO are plotted superimposed with each other, all versus time. In both the DCM and ADCM cases, as the output current IO decreases during CCM operation, the inductor current IL toggles in decreasing manner generally following the output current. At about a time t0 in both cases, the inductor current IL reaches zero initiating DCM operation. The UG and LG pulses begin to spread out as the output current IO continues to decrease.

In the DCM operation case, as the output current IO continues to decrease, the period between successive switching cycles increases accordingly, and operation eventually reaches the audible range. In the ADCM operation case, if the period between switching cycles reaches the super-sonic threshold period $SP_{TH}$ corresponding with the super-sonic frequency threshold $F_{SW\_ADCM}$ just above the audible threshold range, then the ADCM operating mode is initiated. As shown in FIG. 5, when the period reaches $SP_{TH}$, an LG pulse is initiated to artificially fix the switching frequency above the audible range, or at $F_{SW\_ADCM}$. A first of such pulses is shown at 501 initiated at time t1. The LG pulse 501 is followed by a UG pulse 502, which is then followed by another LG pulse 503. If the output current IO remains at this level (or decreases but would otherwise remain in the audible range for DCM), the switching period is fixed at $SP_{TH}$ and the pattern of pulses continues as shown at 505 and 507.

In one embodiment, $SP_{TH}=1/25$ KHz=40 microseconds (µs) which corresponds with a super-sonic switching frequency $F_{SW\_ADCM}$ of about 25 kilohertz (KHz), which is above the audible frequency range (e.g., above 20 KHz).

Figure 6:
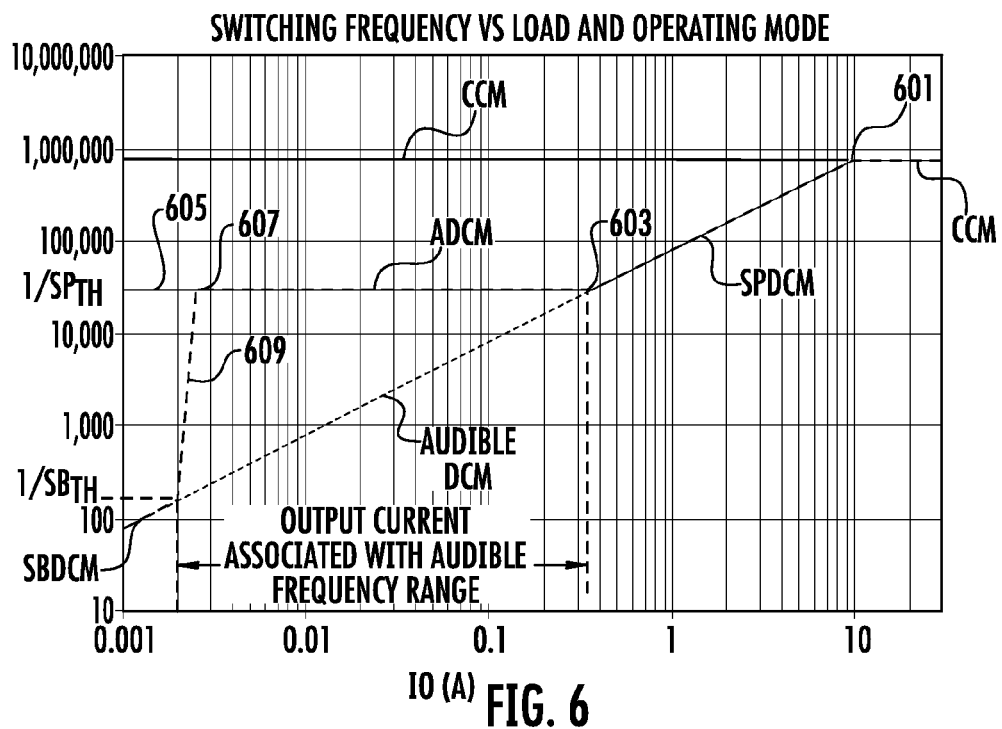
FIG. 6 is a graphic diagram plotting switching frequency (in Hz) versus output current IO in Amperes (A) for each of the operating modes CCM, DCM and ADCM for one embodiment of the regulator of FIG. 2.

FIG. 6 is a graphic diagram plotting switching frequency in Hertz (Hz) versus output current IO in Amperes (A) for each of the operating modes CCM, DCM and ADCM for one embodiment of the regulator 103. At higher output currents, such as above 10 A in the illustrated embodiment, the regulator 103 operates in CCM at a relatively high switching frequency, such as just below or near 1 Megahertz (MHz). As the output current IO decreases, such as below 10 A in this embodiment, operation switches to DCM as shown at transition point 601. If operation were to be continued in CCM at lower output current levels below the transition point 601, the switching frequency would remain substantially fixed all the way down to very low or no load conditions. After switching to DCM, however, the switching frequency decreases as the output current IO decreases. Initially during DCM, the switching frequency is above the audible range so that DCM operation is at SPDCM.

As the output current IO continues to decrease during DCM, the switching frequency decreases until it approaches the super-sonic frequency threshold $F_{SW\_ADCM}$ corresponding with the super-sonic threshold period $SP_{TH}$. When the super-sonic frequency threshold is reached during DCM, operation switches to ADCM as shown at transition point 603. Thus, rather than continuing in audible DCM which would generate audible frequencies, operation switches to ADCM to remain at the super-sonic operating frequency $F_{SW\_ADCM}$ for ADCM.

As the output current IO continues to decrease, the switching frequency decreases until it approaches a sub-sonic frequency threshold $F_{SW\_SBDCM}$. Rather than continuing in the ADCM mode at sub-sonic frequencies as shown at 605, beginning at transition point 607 operation transitions back to the DCM mode as shown by transition line 609. In one embodiment, this transition occurs at a sub-sonic frequency threshold $F_{SW\_SBDCM}$ which corresponds with a sub-sonic threshold period $SB_{TH}$. When the output current approaches a very low current threshold, such as about 0.002 A in the illustrated embodiment, the operating frequency transitions from ADCM at $F_{SW\_ADCM}$ to SBDCM at $F_{SW\_ADCM}$ when the switching period is at or above $SB_{TH}$. As shown, there is an output current range corresponding with the audible switching frequency range between $F_{SW\_ADCM}$ (1/$SP_{TH}$) and $F_{SW\_SBDCM}$ (1/$SB_{TH}$).

In one embodiment, the sub-sonic frequency threshold $F_{SW\_SBDCM}$ is about 100 Hz in which the sub-sonic threshold period $SB_{TH}$ is about 1/100 Hz=10 milliseconds (ms). Although a frequency of 100 Hz may be considered as within the audible range (e.g., down to 20 Hz), the frequency is sufficiently low and operation is at relatively low energy.

The switching frequency of DCM at very low output current and sub-sonic frequency is the SBDCM operating mode. If the output current IO remains low such that the switching frequency remains sub-sonic, operation remains in SBDCM. If the output current IO increases, operation transitions back to ADCM, SPDCM or CCM depending upon the level of the output current level.

Figure 7:
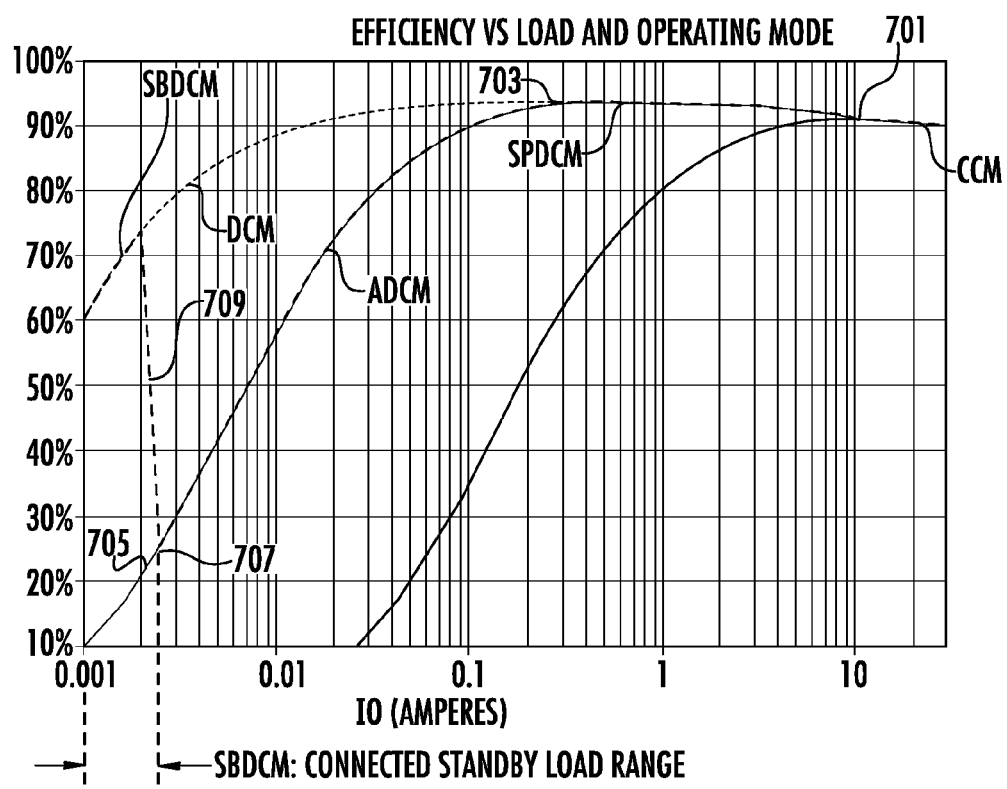
FIG. 7 is a graphic diagram plotting power conversion efficiency (in terms of percentage) versus output current IO of the regulator of FIG. 2 according to one embodiment.

FIG. 7 is a graphic diagram plotting power conversion efficiency (in terms of percentage) versus output current IO of the regulator 103 according to one embodiment. Transitions points 701, 703 and 707 of FIG. 7 corresponding with transition points 601, 603 and 607, respectively, of FIG. 6 in terms of the output current IO. At high loads above the transition point 601 which corresponds with the transition point 701, operation is according to CCM, which has a relative high efficiency. Below the transition point 701 for CCM corresponding with an output current below 10 A, the efficiency for CCM drops quickly. Thus, when the output current IO is below the transition point 701, operation transitions to super-sonic DCM, or SPDCM, with operating frequency above the audible range. The efficiency of SPDCM remains very high as compared to the efficiency of CCM.

When the output current IO decreases such that the switching frequency approaches the super-sonic frequency threshold $F_{SW\_ADCM}$ corresponding with the super-sonic threshold period $SP_{TH}$ associated with transition points 603 and 703, operation switches to the ADCM mode. It is appreciated that the ADCM mode is less efficient than DCM when the output current IO is between the transition points 703 and 707 for operation according to ADCM. As previously described, however, operation according to DCM causes the regulator 103 to generate audible frequencies which may be converted to undesirable noise of the electronic device. Thus, when the output current IO is between the transition points 703 and 707, operation is according to ADCM with switching frequency $F_{SW\_ADCM}$. ADCM is less efficient than DCM, but artificially forces the operating frequency to remain above the audible frequency range to prevent the regulator 103 from generating audible noise.

As the output current IO continues to decrease, the switching frequency decreases until it approaches the sub-sonic frequency threshold $F_{SW\_SBDCM}$ corresponding with the sub-sonic threshold period $SB_m$. Rather than continuing in the ADCM mode at sub-sonic frequencies as shown at 705 (which corresponds with 605), beginning at transition point 707 operation transitions back to the DCM mode as shown by transition line 709 corresponding with 609. As previously noted, operation in DCM at very low output current is referred to as SBDCM.

The SBDCM operating range may be referred to as the connected standby load range. Connected standby operation means that the regulator 103 is in a low-powered state, including an idle state, and that may be transitioned very quickly into ADCM, SPDCM or CCM depending upon load conditions. The SBDCM operating mode is substantially more efficient than the ADCM operating range and thus achieves the goals of high efficiency during connected standby operation.

Figure 8:
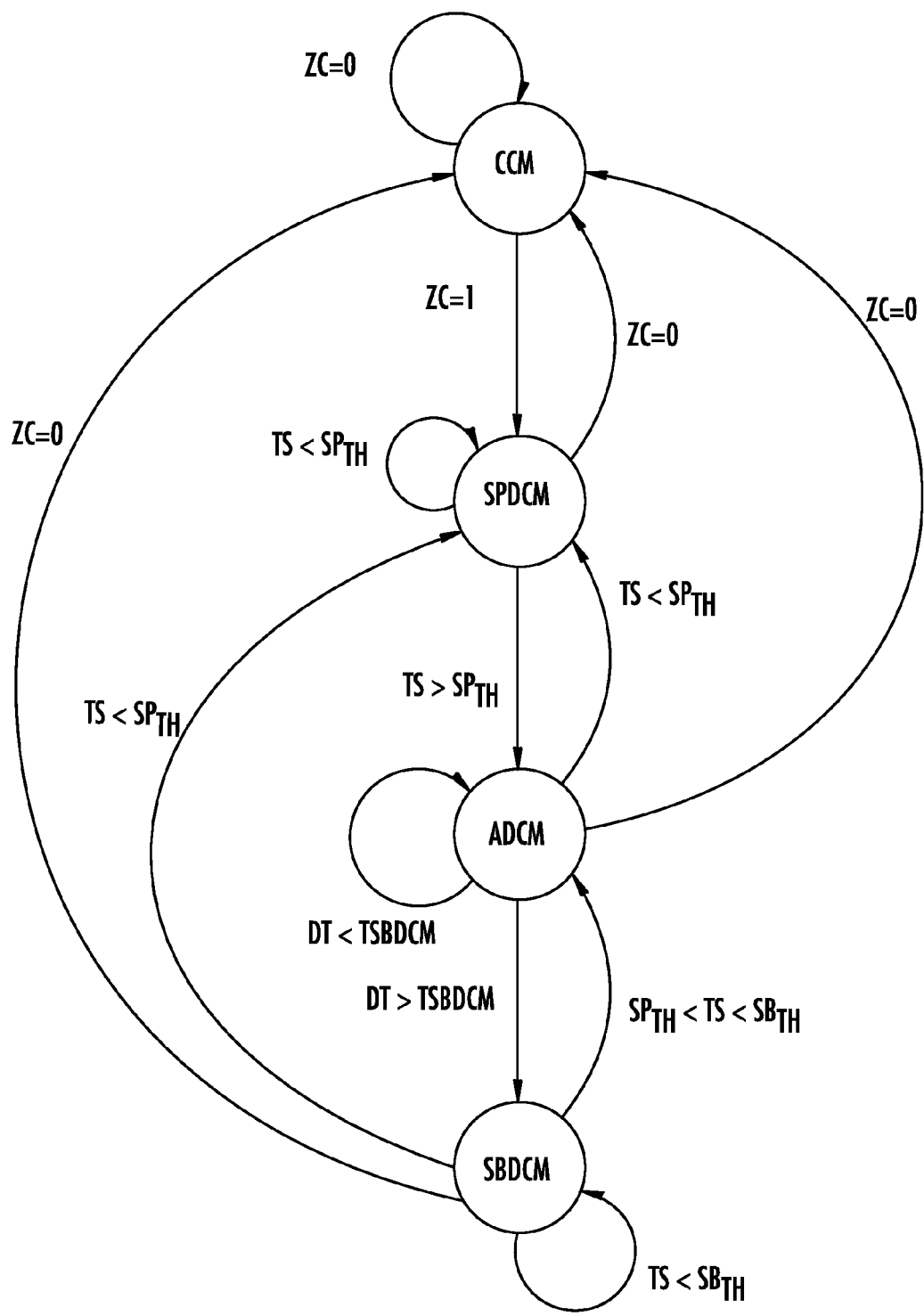
FIG. 8 is a state diagram illustrating the four different states corresponding with modes CCM, SPDCM, ADCM and SBDCM, respectively, of the regulator of FIG. 2 and corresponding transition conditions according to one embodiment.

FIG. 8 is a state diagram illustrating the four different states corresponding with modes CCM, SPDCM, ADCM and SBDCM, respectively, of the regulator 103 and corresponding transition conditions according to one embodiment. In CCM, the frequency is fixed or "pseudo-fixed" and is entered into when the inductor current IL is positive for the entirety of the switching cycle at higher load levels. The term "pseudo-fixed" means that the regulator 103 may have a fixed steady state frequency which may vary based on load conditions. It is noted that the regulator circuitry or logic may force CCM in certain conditions even if the inductor current goes to zero preventing switching to DCM. An inductor zero current crossing detection value ZC is a logic signal that is logic "0" when the inductor current does not fall to zero and is a logic "1" when the inductor current goes to zero. The ZC value may be detected during PWM off time (e.g., when PWM goes low) and may remain unchanged when PWM goes high. While ZC=0, operation remains in the CCM mode.

If ZC=1, indicating that the inductor current IL has dropped to zero, operation transitions to SPDCM from CCM. While in SPDCM, the switching period of the modulator 205, TS, is monitored by the ADCM controller 211. While the switching period TS of the regulator 103 remains less than the super-sonic threshold period $SP_{TH}$, or TS<$SP_{TH}$, operation remains in SPDCM. The SPDCM operating mode is a very efficient super-sonic operating mode. If ZC goes back to 0, operation transitions back to CCM.

When in the SPDCM operating mode, if TS rises above $SP_{TH}$ as detected by the ADCM controller 211, or TS>$SP_{TH}$, then operation proceeds to the ADCM operating mode (assuming ZC=1). During SPDCM, the LG signal is effectively suspended from remaining asserted for the remainder of the cycle according to DCM. During the ADCM mode, however, the suspension of the LG signal is effectively superseded to prevent switching frequency in the audible range. For example, upon timeout of a timer or the like indicating that TS has exceeded $SP_{TH}$, the ADCM controller 211 triggers an early pulse on LG to expedite DCM operation, and operation transitions to ADCM. Operation remains in ADCM while ZC=1 and the switching frequency would otherwise be in the audible range. If TS falls below $SP_{TH}$ while in ADCM, operation transitions back to the SPDCM mode. If ZC=0 while in ADCM, operation transitions back to CCM.

It is noted that while in ADCM, the switching frequency is artificially prevented from dropping into the audible frequency range by the ADCM controller 211. In this manner, if the load as indicated by the output current IO continues to drop, the switching period TS is effectively fixed at $SP_{TH}$ and thus provides insufficient information to determine when to transition to the SBDCM operating mode. It is desired to detect a sub-sonic operating condition and to switch back to DCM at sub-sonic switching frequencies, which is the SBDCM operating mode.

In one embodiment, the duration of a timing value DT (Δt) is monitored by the SBDCM controller 213 during the ADCM operating mode and compared with a corresponding timing threshold TSBDCM to determine when to transition from ADCM to SBDCM. As long as the duration DT remains below TSBDCM, or DT<TSBDCM, then operation remains in ADCM. If while in the ADCM operating mode, however, DT rises above TSBDCM, or DT>TSBDCM, then operation transitions to the SBDCM operating mode. The comparison between DT and TSBDCM is used to detect the sub-sonic operating condition for switching to the SBDCM operating mode. There are several different embodiments for the configuration of determining DT and its corresponding threshold TSBDCM. In one embodiment, the first LG pulse (LG1) during ADCM may be monitored. In another embodiment, the second LG pulse (LG2) during ADCM may be monitored. In other embodiments, the duration (or portion thereof) of the UG pulse during ADCM may be monitored.

In the SBDCM mode which is sub-sonic DCM, TS may again be monitored to determine when to transition to ADCM or SPDCM. As long as TS remains greater than the sub-sonic threshold period $SB_{TH}$, or TS>$SB_{TH}$, operation remains in the SBDCM operating mode (while ZC is 1). If TS drops below $SB_{TH}$ while remaining above $SP_{TH}$, or SPTH<TS<$SB_{TH}$, then operation returns to the ADCM operating mode (while ZC is 1). If TS drops below $SP_{TH}$ while ZC is 1, operation returns directly to the SPDCM operating mode. If Z goes back to 0 at anytime in any other mode, operation returns to the CCM operating mode.

Figure 9:
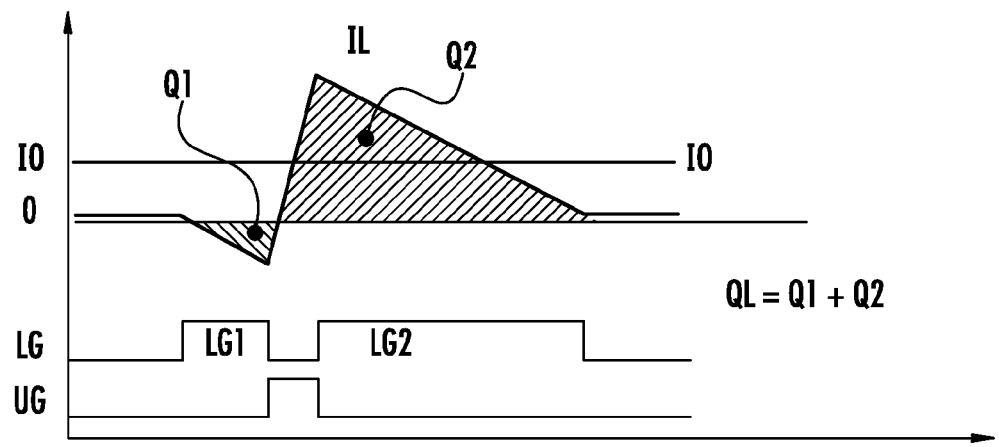
FIG. 9 is a plot of the inductor current IL superimposed with output current IO and aligned with corresponding plots of LG and UG during a single switching cycle in the ADCM operating mode of the regulator of FIG. 2 according to one embodiment.

FIG. 9 is a plot of the inductor current IL superimposed with output current IO and aligned with corresponding plots of LG and UG during a single switching cycle in the ADCM operating mode of the regulator 103 according to one embodiment. An first pulse on LG, or LG1, prematurely terminates the normal DCM period early causing the inductor current IL to go negative. A charge Q1 is pulled from the output (load and output capacitor). The LG1 pulse is then terminated and a UG pulse is initiated causing the inductor current IL to increase to a peak positive level. Then the UG pulse is terminated and another LG pulse, or LG1, is then initiated causing the inductor current IL to decrease back to zero. When the inductor current IL reaches zero, the LG2 pulse is terminated and both signals UG and LG are low for the remainder of the cycle. A charge Q2 is added to the output (load and output capacitor). A total charge of QL is equal to Q1 added to Q2, or QL=Q1+Q2. If the output conditions are such that a UG pulse is initiated during ADCM according to normal DCM operation, then operation transitions to the SPDCM operating mode. If, however, the $SP_{TH}$ period expires before another UG pulse is initiated, then another LG pulse is initiated and operation continues in ADCM with repeating cycles as shown in FIG. 5.

Figure 10:
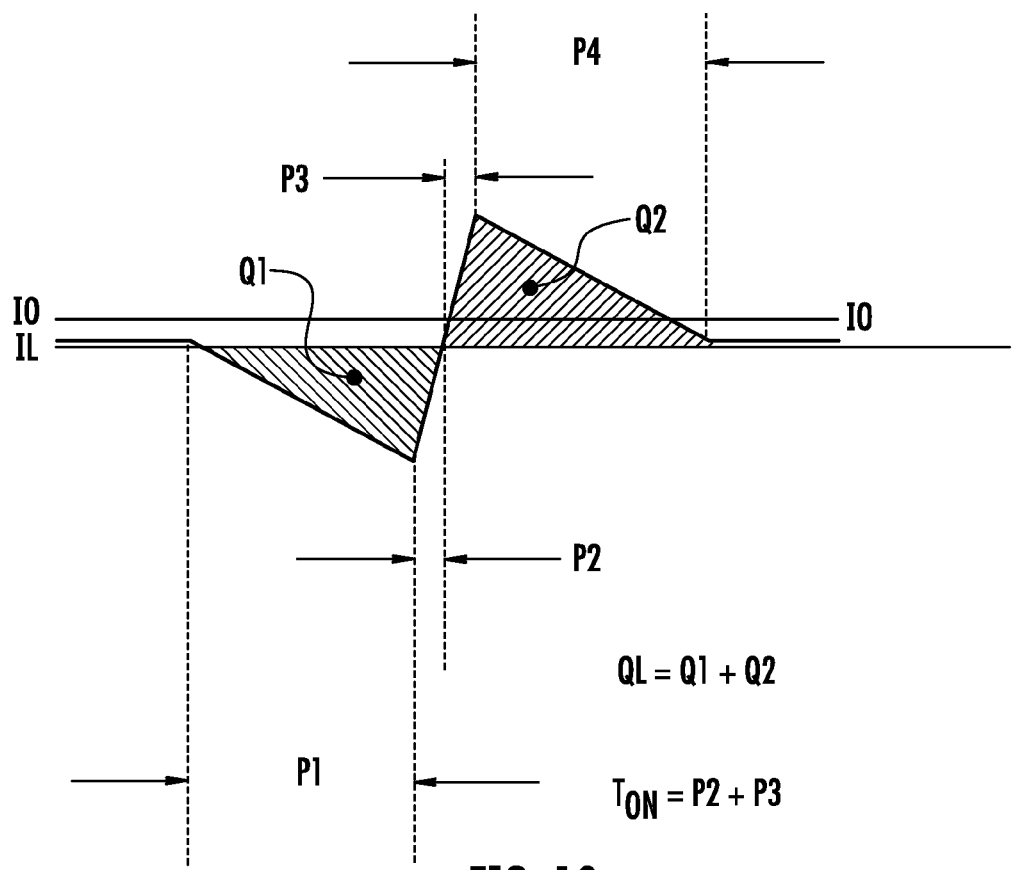
FIG. 10 is a plot of the inductor current IL superimposed with output current IO during another single switching cycle in the ADCM operating mode of the regulator of FIG. 2 according to one embodiment.

FIG. 10 is a plot of the inductor current IL superimposed with output current IO during another single switching cycle in the ADCM operating mode of the regulator 103 according to one embodiment. FIG. 10 is similar to that shown in FIG. 9, except that the output current IO is lower, which causes Q1 to increase and Q2 to decrease by corresponding amounts relative to that shown in FIG. 9. It is noted that the charge delivery though the inductor L remains sufficient to maintain the load (as indicated by the output current IO). Thus, Q1 increases while Q2 decreases as the load diminishes during ADCM. A duration of the first LG1 pulse is a period P1, a duration of the UG pulse is a period $T_{ON}$=P2+P3, and a duration of the second LG2 pulse is a period P4.

As noted above, the switching frequency $F_{SW\_ADCM}$ during ADCM is artificially fixed at a level related to the super-sonic threshold period $SP_{TH}$, or $F_{SW\_ADCM}$=1/$SP_{TH}$. It is desired to determine when the load has reduced to a point where the modulator 205 may safely transition between the ADCM and SBDCM operating modes in order to achieve the SBDCM operating mode.

For conventional DCM, the relationship of the output current IO and the switching frequency $F_{SW}$ at a fixed PWM on time period of $T_{ON}$ (UG on time) is according to the following equation (1):

$$IO = \frac{F_{SW\_DCM} \cdot VIN(VIN - VO) \cdot T_{ON}^2}{2 \cdot VO \cdot L} \quad (1)$$

where $F_{SW\_DCM}$ is the DCM switching frequency and L is the inductance of the output inductor L. During ADCM, the relationship of the output current IO and the switching frequency $F_{SW}$ at a fixed period of $T_{ON}$ is according to the following equation (2):

$$IO = \frac{F_{SW\_ADCM} \cdot VIN(VIN - VO)}{2 \cdot VO \cdot L}[2 \cdot T_{ON} \cdot P3 - T_{ON}^2] \quad (2)$$

where P3 is the duration of the UG pulse when the inductor current IL is positive during each ADCM switching cycle.

The value of L is known for a given implementation. The values of VIN, VO and $T_{ON}$ may be provided, measured or otherwise derived dynamically during operation. The value of $F_{SW\_ADCM}$ is predetermined. The value of $F_{SW\_DCM}$ at the point of transition is a value $F_{SW\_SBDCM}$, which is also predetermined according to the selected sub-sonic threshold period $SB_{TH}$, or $F_{SW\_SBDCM}$=1/$SB_{TH}$. The two equations (1) and (2) are set equal to each other for the desired transition point between ADCM and SBDCM, and then the resulting equation is solved for P3. The values Q1 and Q2 are derived using QL, $T_{ON}$ and the load relationships to solve for P1, P2 and P4. P1-P4 are according to the following equations (3), (4), (5) and (6), respectively:

$$P1 = T_{ON}\left[\frac{F_{SW\_ADCM} - F_{SW\_SBDCM}}{2 \cdot F_{SW\_ADCM}}\right]\frac{(VIN - VO)}{VO} \quad (3)$$

$$P2 = T_{ON}\left[\frac{F_{SW\_ADCM} - F_{SW\_SBDCM}}{2 \cdot F_{SW\_ADCM}}\right] \quad (4)$$

$$P3 = T_{ON}\left[\frac{F_{SW\_ADCM} + F_{SW\_SBDCM}}{2 \cdot F_{SW\_ADCM}}\right] \quad (5)$$

$$P4 = T_{ON}\left[\frac{F_{SW\_ADCM} + F_{SW\_SBDCM}}{2 \cdot F_{SW\_ADCM}}\right]\frac{(VIN - VO)}{VO} \quad (6)$$

In various embodiments, timing circuits may by employed to monitor the UG or LG pulses to determine the duration of any one or more of the periods P1-P4 during the ADCM operating mode and compared against a predetermined timing threshold TSBDCM to transition from the ADCM operating mode to the SBDCM operating mode. The duration of any one of the periods P1-P4 may be used and compared to a corresponding predetermined threshold to determine the appropriate transition point from ADCM to SBDCM. The durations P1 and P4 are generally the longer time periods (as compared to P2 and P3) for low duty cycles (e.g., during low power conditions) potentially providing more accurate results.

Figure 11:
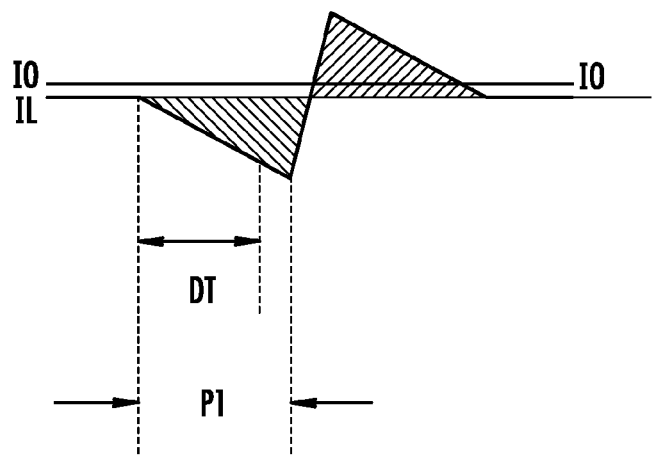
FIG. 11 is a plot of IO and IL similar to FIGS. 9 and 10 and also showing the corresponding LG pulses LG1 and LG2 during the ADCM operating mode of the regulator of FIG. 2 according to one embodiment.
Figure 11:
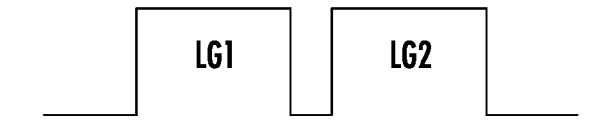

FIG. 11 is a plot of IO and IL similar to FIGS. 9 and 10 and also showing the corresponding LG pulses LG1 and LG2 during ADCM of the regulator 103 according to one embodiment. LG1 corresponds with the time period P1 during ADCM, which may be used as the timing variable DT.

Figure 12:
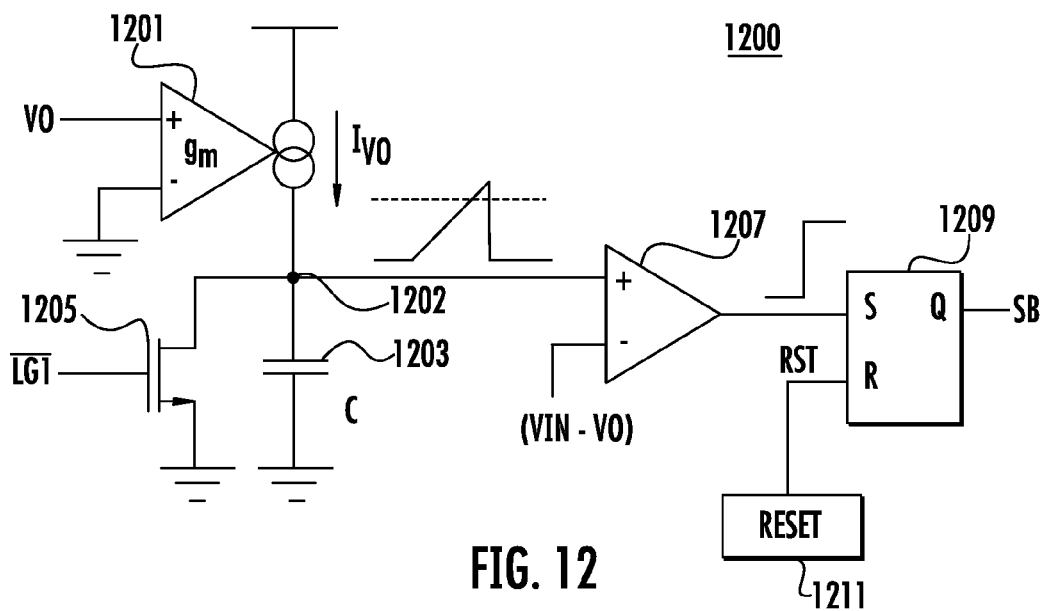
FIG. 12 is a schematic diagram of one embodiment of an SB detect circuit provided within the SBDCM block of FIG. 2 for determining when to transition to SBDCM from the ADCM operating mode when DT reaches P1 corresponding to the sub-sonic threshold condition according to one embodiment.

FIG. 12 is a schematic diagram of one embodiment of an SB detect circuit 1200 provided within the SBDCM controller 213 for determining when to transition to SBDCM from the ADCM operating mode when DT reaches P1 corresponding to the sub-sonic threshold condition according to one embodiment. A transconductance amplifier 1201 has a positive input receiving VO and a negative input coupled to ground. The output of the transconductance amplifier 1201 is coupled to a node 1202, and a capacitor 1203 is coupled between node 1202 and ground. A switch 1205 has current terminals coupled between node 1202 and ground across the capacitor 1203. Node 1202 is coupled to the positive input of a comparator 1207, receiving a value indicative of the difference (VIN−VO) at its negative input. The output of the comparator 1207 is coupled to the set (S) input of a set-reset (SR) flip-flop (SRFF) 1209, having a non-inverting or Q output providing a signal SB. A reset block 1211 has an output providing a reset signal RST to the reset (R) of the SRFF 1209.

A signal $\overline{LG1}$ is provided to the control input of the switch 1205. The signal $\overline{LG1}$ is normally high and goes low when the LG1 signal is asserted high as the first pulse of LG during each switching cycle of ADCM. The switch 1205 may be a transistor device, such as a FET or MOS type transistor having drain and source current terminals and a gate control terminal. Any other suitable type of switch is contemplated including various other types of transistors.

In operation, when $\overline{LG1}$ is high, the switch 1205 is turned on shorting the capacitor 1203 so that node 1202 is low. When the voltage of node 1202 is low, the output of the comparator 1207 is low and the SB signal remains low. When $\overline{LG1}$ is low corresponding with the time period P1, the capacitor 1203 is charged to increase the voltage of node 1202. If the voltage of the node 1202 goes above the value (VIN−VO), then the comparator 1207 transitions high and the SRFF 1209 asserts the SB signal high. In one embodiment, when the SB signal goes high, the SBDCM controller 213 transitions operation from ADCM to SBDCM.

The output of the transconductance amplifier 1201 develops a current $I_{VO}$ that is proportional to the output voltage VO by a transconductance gain factor "gm." A ratio value R is set equal to the value within the square brackets of equation (3), or R=($F_{SW\_ADCM}-F_{SW\_SBDCM}$)/2·$F_{SW\_ADCM}$. The capacitor 1203 has a capacitance C. The ratio of C/gm is set equal to R·$T_{ON}$. In this manner, DT is determined according to the following equation (7):

$$DT = \frac{C}{gm}\left[\frac{VIN - VO}{VO}\right] \quad (7)$$

The pulse of LG1 shown in FIG. 11 corresponds with the time P1. While the pulse LG1 is high during ADCM, the $\overline{LG1}$ signal is low corresponding with DT. In this manner, if the pulse of LG1 is high for a duration of P1 solved for the sub-sonic transition value, then operation transitions from ADCM to SBDCM.

In a more specific embodiment, $F_{SW\_ADCM}$=25 KHz, $F_{SW\_SBDCM}$=100 Hz, so that the ratio R=0.498. $T_{ON}$ is selected as 1 micro-second (μs). Thus, C/gm=0.498·1 μs=498 nanoseconds (ns). In one embodiment, C=10 pico-Farads (pF) and gm is selected as 20 μmhos (μS).

Figure 13:
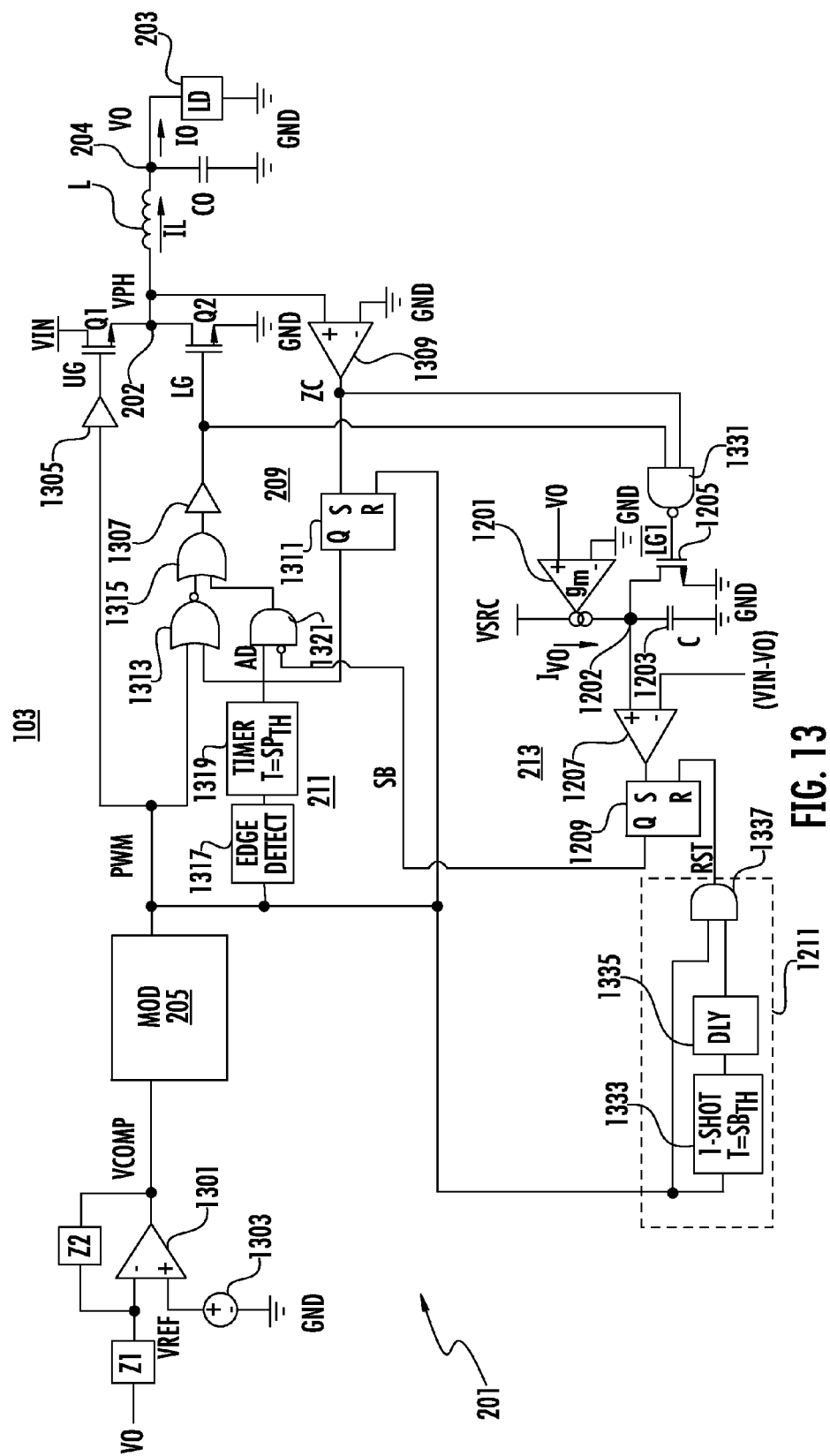
FIG. 13 is a more detailed schematic and block diagram of the regulator of FIG. 2 according to one embodiment incorporating details of the DCM, ADCM and SBDCM blocks.

FIG. 13 is a more detailed schematic and block diagram of the regulator 103 according to one embodiment. Although more detailed, the schematic and block diagram of the regulator shown in FIG. 13 is simplified to avoid unnecessary detail while still completely illustrating the principles according to the present invention incorporated within the regulator 103. The output voltage VO is provided through an error network including compensation impedances Z1 and Z2, an error amplifier 1301, and a voltage source 1303 referenced to GND developing a reference voltage VREF. The impedances may include any suitable combination of resistance, capacitance and/or inductance for providing suitable compensation, and usually comprises a resistor or resistor-capacitor (RC) combination. As shown, VO is provided through impedance Z1 to a negative input of the error amplifier 1301, which receives VREF at its positive input and which develops a compensation voltage VCOMP at its output. VREF represents the target voltage of VO or a feedback voltage level indicative of VO. The impedance Z2 is coupled in a feedback configuration between the negative input and output of the error amplifier 1301.

It is noted that VO may be provided directly or via a sense network (not shown), such as a voltage divider or the like for dividing the voltage down to a feedback voltage provided to the error network. The impedances Z1 and Z2 provide loop compensation as understood by those of ordinary skill in the art. In general, the error amplifier 1301 of the error network amplifies a difference between the output voltage or a feedback version thereof and VREF to develop VCOMP.

VCOMP is provided to an input of the modulator 205 of the controller 201, and the modulator 205 develops the pulse control signal or PWM signal at its output. The PWM signal is provided to the input of a buffer/driver 1305, having its output providing the UG signal to the gate of Q1. The PWM signal, or a modified and inverted version thereof as further described herein, is provided to another buffer/driver 1307, having its output providing the LG signal to the gate of Q2. The converter portion of the regulator 103, including the switches Q1 and Q2, the output inductor L, the output capacitor CO, and the load 203, are coupled to operate in substantially similar manner previously described for developing the currents IL and IO and the voltages VPH and VO for converting the input voltage VIN to the regulated output voltage VO.

The buffer/drives 1305 and 1307 form part of the DVR block 207 for driving the switches Q1 and Q3 based on the PWM signal. Additional details of the DVR block 207 are not shown, such as additional support circuitry for proper operation. For example, the DVR block 207 may include additional circuitry to ensure that only one of the switches Q1 and Q2 is turned on at a time to avoid temporarily grounding VIN or VO. Furthermore, bootstrapping or charge pump circuitry or the like may be included to facilitate driving the gates of Q1 and Q2 above the VIN and VO rails, respectively.

The DCM controller 209 is implemented with a phase comparator 1309, an SRFF 1311 and additional logic to incorporate the DCM mode of operation. In the illustrated embodiment, the additional logic includes a 2-input NOR gate 1313 inserted in the switching control path. The positive input of the phase comparator 1309 is coupled to the phase node 202, its negative input is coupled to GND, and its output develops the ZC signal provided to the S input of the SRFF 1311. The R input of the SRFF 1311 receives PWM and its output is provided to one input of the NOR gate 1313. The other input of the NOR gate 1313 receives the PWM signal, and its output is provided to one input of a 2-input OR gate 1315. The output of the OR gate 1315 is coupled to the input of the buffer/driver 1307. The OR gate 1315 is part of the ADCM controller 211 and its other input is coupled to circuitry provided for the ADCM controller 211 and the SBDCM controller 213 described further below.

During the CCM mode of operation, the PWM signal is asserted high starting a new cycle, so that UG goes high and LG goes low via operation of the NOR gate 1313 (ignoring operation of the OR gate 1315). When PWM goes low, UG is pulled low and LG is asserted high for the remainder of the cycle. The current IL through the output inductor L generally stays positive so that the voltage VPH of the phase node 202 stays negative, so that the ZC signal remains low. The output of the SRFF 1311 stays low so that the DCM controller 209 does not affect CCM operation.

When the load decreases such that the output current IO decreases, the current IL decreases accordingly and may go negative. If the current IL goes negative, then the voltage of VPH goes positive and the phase comparator 1309 asserts ZC high at its output. ZC going high sets the SRFF 1311 so that it asserts its output high. The NOR gate 1313 responsively pulls its output low pulling LG low thus terminating the LG pulse early according to DCM operation. In DCM mode, when PWM next goes high, UG is asserted high and LG low to initiate the next cycle. The PWM signal resets the SRFF 1311, and operation may repeat in DCM mode or switch back to CCM mode depending upon load conditions as indicated by the ZC signal.

It is noted that the phase comparator 1309 may be replaced with any type of detect circuit capable of detecting when the current through the inductor L reaches zero or otherwise crosses a zero threshold indicating low load conditions.

The ADCM controller 211 is implemented with an edge detect block 1317, a timer 1319 and the OR gate 1315. The PWM signal is provided to an input of the edge detect block 1317, having its output coupled to an input of the timer 1319. The timer 1319 has an output providing a signal AD to a non-inverted input of a 2-input AND gate 1321. The output of the AND gate 1321 is provided to the other input of the OR gate 1315. The AND gate 1321 is provided as part of the SBDCM controller 213 having its other input inverted and receiving the SB signal. For the ADCM mode, it is assumed that SB is low so that operation of the AND gate 1321 may be temporarily ignored.

In operation of the ADCM controller 211, each time PWM goes high, the edge detect block 1317 detects the rising edge of the pulse on PWM and resets the timer 1319. The timer 1319 has a period equal to the super-sonic threshold period $SP_{TH}$ and asserts the AD signal high to transition to the ADCM mode upon timeout of the timer 1319. In the CCM and SPDCM modes of operation, the PWM pulses occur too quickly so that the timer 1319 is continuously reset so that AD is not asserted. If during the SPDCM mode the period between consecutive pulses exceeds the super-sonic threshold period $SP_{TH}$, the timer 1319 times out and asserts the AD signal high. The AD signal going high pulls LG high earlier in the cycle than would normally occur for DCM as illustrated in FIG. 5. The early assertion of the LG pulse prevents the switching frequency during DCM from dropping into the audible range as previously described.

As previously illustrated in FIG. 8, if the output load increases such that the pulses on PWM increase in frequency such that TS becomes less than $SP_{TH}$, operation transitions back to the SPDCM mode. If the output load increase substantially such that ZC goes back low, then operation transitions back to the CCM mode. However, if the output load continues to decrease, then operation may transition to the SBDCM mode.

The SBDCM controller 213 includes the SB detect circuit 1200, the reset block 1211, and any additional supporting logic for entering and exiting the SBDCM mode of operation. In the illustrated embodiment, the additional logic includes a 2-input NAND gate 1331 receiving the LG and ZC signals at its inputs and providing the $\overline{LG1}$ signal at its output to the gate of the switch 1205. In this manner, during an LG pulse when ZC is high indicating low load conditions during the ADCM mode of operation as previously described as the LG1 pulse, the $\overline{LG1}$ signal is asserted low and node 1202 ramps up as the capacitor 1203 is charged. If the voltage of node 1202 exceeds the voltage of (VIN−VO) indicating that the duration of the LG1 pulse has exceeded the corresponding timing threshold (e.g., TSBDCM) as previously described, the comparator 1207 asserts its output high and the SRFF 1209 latches SB high.

The SBDCM controller 213 further includes the AND gate 1321 inserted in the switching control path to detect SB and switch operation to the SBDCM mode. Thus, when SB is latched high, the AND gate 1321 blocks or otherwise inhibits the AD signal from being provided to the OR gate 1315 to effectively bypass the ADCM operating mode and transition to the SBDCM operating mode.

The reset block 1211 includes a 1-shot device 1333, a delay block 1335 and a 2-input AND gate 1337. The PWM signal is provided to one input of the AND gate 1337 and to the input of the 1-shot device 1333. The output of the 1-shot device 1333 is provided to the input of the delay block 1335, having its output provided to the other input of the AND gate 1337. The AND gate 1337 asserts the RST signal at its output which is coupled to the reset input of the SRFF 1209. The 1-shot device 1333 generates a pulse having a period "T" corresponding with the sub-sonic threshold period $SB_{TH}$ for detecting the period TS of switching of the PWM signal.

In operation, while the period TS, as detected between consecutive PWM pulses, exceeds $SB_{TH}$ and while ZC is asserted high (logic 1), operation remains in the SBDCM mode. If the period TS decreases to less than $SB_{TH}$ while in SBDCM, then the reset block 1211 asserts the RST signal to clear the SB signal low to exit SBDCM. If the period TS remains greater than $SP_{TH}$, then operation transitions to the ADCM mode. If the period TS becomes less than $SP_{TH}$, then operation transitions to the SPDCM mode. Anytime that ZC goes back to zero, operation returns to the CCM mode of operation.

It is now appreciated that when the load is relatively high, the regulator 103 is configured to operate in CCM. As shown in FIG. 7, CCM is relatively efficient at the higher loads. When the load drops to a relatively light level causing the current through the output inductor L to go to zero or possibly negative during switching cycles, the regulator 103 is configured to switch to super-sonic DCM, or SPDCM. As shown in FIG. 7, SPDCM is a very efficient operating mode. If the load would otherwise cause a switching frequency of the regulator 103 in the audible range, the regulator 103 is configured to switch to ADCM. As shown in FIG. 7, ADCM is more efficient than CCM but less efficient than DCM. Nonetheless, the switching frequency of the regulator 103 is artificially operated just above the audible range to prevent audio noise.

In the illustrated embodiment, the SB detect circuit 1200 within the SBDCM controller 213 of the controller 201 monitors operation of the modulator 205 via the PWM and LG signals during ADCM operation and determines when operation may be switched back to DCM at very low loads when the switching frequency is below the audible range, which is the SBDCM operating mode. As shown in FIG. 7, SBDCM allows higher efficiency operation than otherwise available with ADCM during connected standby operation at very low or even idle modes. In this manner, relatively high efficiency is achieved for connected standby operation.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. A controller for controlling operation of a switching regulator, comprising:
　a modulator that develops a pulse control signal for controlling pulses on at least one switch control signal to operate in a continuous conduction mode;
　a discontinuous conduction mode controller that detects a low load condition and that modifies operation to operate in a discontinuous conduction mode while said low load condition is detected;
　an audible discontinuous conduction mode controller that detects a switching frequency that is less than a predetermined super-sonic frequency threshold and that modifies discontinuous conduction mode operation to maintain said switching frequency at a super-sonic frequency level; and
　a sub-sonic discontinuous conduction mode controller that detects a sub-sonic operating condition during audible discontinuous conduction mode operation and that responsively inhibits operation of said audible discontinuous conduction mode controller to allow a sub-sonic discontinuous conduction mode within a sub-sonic switching frequency range.

2. The controller of claim 1, wherein said sub-sonic discontinuous conduction mode controller comprises a timer and comparator circuit that compares a duration of a pulse on said at least one switch control signal with a predetermined timing threshold.

3. The controller of claim 1, wherein said sub-sonic discontinuous conduction mode controller comprises a timer and comparator circuit that enables operation of said audible discontinuous conduction mode controller when said switching frequency is greater than a predetermined sub-sonic frequency threshold.

4. The controller of claim 3, wherein said timer and comparator circuit compares a period of said pulse control signal with a predetermined sub-sonic threshold period.

5. The controller of claim 1, wherein said sub-sonic operating condition is associated with a switching frequency of approximately 100 Hertz.

6. The controller of claim 1, wherein the switching regulator develops a first pulse on a first switch control signal in response to said pulse control signal followed by a second pulse on a second control signal for a remainder of each period of said pulse control signal during said continuous conduction mode, wherein:
　said discontinuous conduction mode controller prematurely terminates the second pulse on the second control signal while the low load condition is detected;
　wherein said audible discontinuous conduction mode controller initiates a new switching cycle when a switching period of said pulse control signal is greater than a predetermined super-sonic threshold period; and
　wherein said sub-sonic discontinuous conduction mode controller inhibits said audible discontinuous conduction mode controller from initiating a new cycle when said sub-sonic operating condition is detected, and allows said audible discontinuous conduction mode controller to initiate a new cycle when said switching period of said pulse control signal is less than a predetermined sub-sonic threshold period.

7. The controller of claim 1, wherein the switching regulator develops a first pulse on a first switch control signal in response to said pulse control signal followed by a second pulse on a second control signal for a remainder of each period of said pulse control signal during said continuous conduction mode, and wherein:
　said discontinuous conduction mode controller comprises:
　　a detect circuit that detects when a current through an output inductor goes to zero and that asserts a zero signal indicative thereof; and
　　a first logic circuit for prematurely terminating the second pulse on the second control signal in response to said zero signal;
　wherein said audible discontinuous conduction mode controller comprises:
　　a timer circuit that detects when a period of said pulse control signal exceeds a predetermined super-sonic threshold period and which asserts an audio detect signal indicative thereof; and
　　a second logic circuit for initiating a third pulse on the second control signal in response to said audio detect signal; and
　wherein said sub-sonic discontinuous conduction mode controller comprises:
　　a timer and comparator circuit that provides a sub-sonic enable signal when a duration of said third pulse on the second control signal is greater than a predetermined timing threshold;
　　a third logic circuit for inhibiting said third pulse on the second control signal in response to said sub-sonic enable signal; and
　　a timer and reset circuit that inhibits said sub-sonic enable signal from being provided when a period of said pulse control signal is less than a predetermined sub-sonic threshold period.

8. The controller of claim 1, wherein said predetermined super-sonic frequency threshold is 25 kilohertz and wherein said sub-sonic switching frequency range is up to 100 Hertz.

9. The controller of claim 1, wherein said sub-sonic discontinuous conduction mode controller comprises:
　a charge node;
　a capacitor coupled between said charge node and a reference node;
　a transconductance amplifier having an output that provides a current proportional to an output voltage to said charge node;

a comparator having a first input coupled to said charge node, having a second input receiving a voltage indicative of a difference between said output voltage and an input voltage, and having an output providing a sub-sonic enable signal;

a switch having current terminals coupled across said capacitor and having a control input receiving an operative pulse during said audible discontinuous conduction mode operation; and wherein said switch is turned off during said operative pulse to enable charging of said capacitor, and is otherwise turned on to short said capacitor.

10. An electronic device, comprising:
a switching regulator, comprising:
an inductor;
a switch circuit, coupled to said inductor, that is configured to switch current through said inductor to convert an input voltage to an output voltage as controlled by a pulse control signal;
an error amplifier circuit that is configured to detect an error of the output voltage and to provide a compensation signal indicative thereof; and
a controller, comprising:
a modulator that receives said compensation signal and that provides said pulse control signal to control pulses on at least one switch control signal provided to said switch circuit to operate said switching regulator in a continuous conduction mode;
a discontinuous conduction mode controller that detects a low load condition and that modifies operation of said switching regulator to operate in a discontinuous conduction mode while said low load condition is detected;
an audible discontinuous conduction mode controller that detects a frequency of said pulse control signal that is less than a predetermined super-sonic frequency threshold and that modifies discontinuous conduction mode operation to prevent a switching frequency of said switching regulator from operating within an audible frequency range; and
a sub-sonic discontinuous conduction mode controller that detects a sub-sonic operating condition during audible discontinuous conduction mode operation and that responsively inhibits operation of said audible discontinuous conduction mode controller to allow said switching regulator to operate at a sub-sonic discontinuous conduction mode.

11. The electronic device of claim 10, further comprising a processor and a memory coupled to said switching regulator.

12. The electronic device of claim 10, wherein said sub-sonic discontinuous conduction mode controller comprises a timer and comparator circuit that compares a duration of a pulse on said at least one switch control signal with a predetermined timing threshold.

13. The electronic device of claim 10, wherein said sub-sonic discontinuous conduction mode controller comprises a timer and comparator circuit that enables operation of said audible discontinuous conduction mode controller when said switching frequency is greater than a predetermined sub-sonic frequency threshold.

14. The electronic device of claim 10, wherein:
said discontinuous conduction mode controller comprises a comparator circuit that detects a zero current crossing of said inductor;
wherein said audible discontinuous conduction mode controller comprises a first timer circuit that detects when a period of said pulse control signal exceeds a predetermined super-sonic threshold period and that asserts an audible discontinuous conduction mode enable signal indicative thereof; and
wherein said sub-sonic discontinuous conduction mode controller comprises a second timer circuit that detects when a duration of one of said at said at least one switch control signal exceeds a predetermined threshold period indicative of said sub-sonic operating condition and that asserts a sub-sonic discontinuous conduction mode enable signal indicative thereof.

15. A method capable of controlling operation of a switching regulator, comprising:
operating in a continuous conduction mode during high load conditions;
operating in a discontinuous conduction mode during low load conditions;
maintaining a switching frequency at a predetermined super-sonic level while a super-sonic threshold condition is detected when operating in the discontinuous conduction mode; and
disabling said maintaining the switching frequency at the predetermined super-sonic level when a sub-sonic threshold condition is detected to enable a sub-sonic discontinuous conduction mode at sub-sonic switching frequencies.

16. The method of claim 15, further comprising re-enabling said maintaining the switching frequency at a predetermined super-sonic level when the switching frequency exceeds a predetermined sub-sonic frequency threshold level.

17. The method of claim 15, wherein:
said maintaining a switching frequency at a predetermined super-sonic level comprises initiating a new switching cycle when a period of a pulse control signal exceeds a predetermined super-sonic threshold period; and
wherein said disabling said maintaining the switching frequency at the predetermined super-sonic level when the sub-sonic threshold condition is detected comprises inhibiting said initiating a new switching cycle when a duration of a switching control signal exceeds a predetermined duration threshold.

18. The method of claim 17, further comprising:
providing a first pulse on a first switching control signal and a second pulse on a second switching control signal for each cycle of the pulse control signal;
terminating the second pulse early during the discontinuous conduction mode;
wherein said initiating a new switching cycle comprises initiating a third pulse on the second switching control signal; and
wherein said inhibiting said initiating a new switching cycle comprises inhibiting said initiating a new switching cycle when a duration of the third pulse exceeds the predetermined duration threshold.

19. The method of claim 18, further comprising:
charging a capacitor with a current proportional to an output voltage during the third pulse;
comparing voltage of the capacitor with a difference voltage between an input voltage an the output voltage; and
wherein said inhibiting said initiating a new switching cycle comprises providing a sub-sonic indication when the voltage of the capacitor exceeds the difference voltage.

20. The method of claim 19, further comprising inhibiting the sub-sonic indication when a period of the when the period of a pulse control signal is less than a predetermined sub-sonic threshold period.

* * * * *